US012608187B2

(12) United States Patent
Allamanis et al.

(10) Patent No.: US 12,608,187 B2
(45) **Date of Patent: \*Apr. 21, 2026**

(54) CODE ADAPTATION THROUGH DEEP LEARNING

(71) Applicant: MICROSOFT TECHNOLOGY LICENSING, LLC., Redmond, WA (US)

(72) Inventors: Miltiadis Allamanis, Cambridge (GB); Shengyu Fu, Redmond, WA (US); Xiaoyu Liu, Sammamish, WA (US); Neelakantan Sundaresan, Bellevue, WA (US); Alexey Svyatkovskiy, Bellevue, WA (US)

(73) Assignee: Microsoft Technology Licensing, LLC, Redmond, WA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/744,672

(22) Filed: Jun. 16, 2024

(65) Prior Publication Data

US 2024/0338188 A1 Oct. 10, 2024

Related U.S. Application Data

(63) Continuation of application No. 17/703,169, filed on Mar. 24, 2022, now Pat. No. 12,032,936.

(51) Int. Cl.
| | |
|---|---|
| *G06F 8/51* | (2018.01) |
| *G06F 8/41* | (2018.01) |
| *G06F 8/52* | (2018.01) |
| *G06F 8/53* | (2018.01) |
| *G06N 3/04* | (2023.01) |
| *G06N 3/08* | (2023.01) |

(52) U.S. Cl.
CPC ............... *G06F 8/51* (2013.01); *G06N 3/08* (2013.01); *G06F 8/41* (2013.01); *G06F 8/433* (2013.01);

(Continued)

(58) Field of Classification Search
CPC ... G06F 8/51; G06F 8/41; G06F 8/433; G06F 16/9027; G06F 40/279; G06F 40/284;

(Continued)

(56) References Cited

U.S. PATENT DOCUMENTS

| | | | | |
|---|---|---|---|---|
| 11,487,522 B1* | 11/2022 | Singh | ...................... | G06F 8/53 |
| 2021/0034335 A1* | 2/2021 | Svyatkovskiy | ........ | G06N 20/00 |

(Continued)

OTHER PUBLICATIONS

Hui Liu et al., Deep Learning Based Program Generation From Requirements Text: Are We There Yet?, Apr. 2022, [Retrieved on Nov. 21, 2025]. Retrieved from the internet: <URL: https://ieeexplore. ieee.org/stamp/stamp.jsp?tp=&arnumber=9173704> 22 Pages (1268-1289) (Year: 2022).*

(Continued)

*Primary Examiner* — Anibal Riveracruz

(57) ABSTRACT

A code adaptation mechanism automatically integrates the variable names of a pasted source code snippet into variable names defined in a pre-existing partial source code program. The variable names from the pasted source code snippet are replaced with anonymized values. A deep learning model predicts the most likely variable name from the pre-existing partial source code program to replace each anonymized value. The deep learning model is trained on numerous variable usage patterns from various source code programs to learn to predict the most likely mapping of an undefined variable name from the pasted source code snippet to a variable name in the pre-existing partial source code program thereby generating a syntactically and semantically correct program.

20 Claims, 7 Drawing Sheets

(51) Int. Cl.

| | |
|---|---|
| *G06F 16/901* | (2019.01) |
| *G06F 40/279* | (2020.01) |
| *G06F 40/284* | (2020.01) |
| *G06F 40/30* | (2020.01) |
| *G06N 3/0455* | (2023.01) |
| *G06N 20/00* | (2019.01) |

(52) U.S. Cl.
CPC ........ *G06F 16/9027* (2019.01); *G06F 40/279* (2020.01); *G06F 40/284* (2020.01); *G06F 40/30* (2020.01); *G06N 3/0455* (2023.01); *G06N 20/00* (2019.01)

(58) Field of Classification Search
CPC ........ G06F 40/30; G06N 3/08; G06N 3/0455; G06N 20/00
See application file for complete search history.

(56) References Cited

U.S. PATENT DOCUMENTS

| | | | | |
|---|---|---|---|---|
| 2022/0261241 A1* | 8/2022 | Balasubramanian | ... | G06F 40/56 |
| 2022/0382527 A1* | 12/2022 | Wang | .................... | G06F 18/214 |
| 2023/0034984 A1* | 2/2023 | Ravindranath | .......... | G06F 8/51 |

OTHER PUBLICATIONS

Communication pursuant to Article 94(3) Received in European Patent Application No. 22854606.5, mailed on Jul. 2, 2025, 08 pages.

Communication under Rule 71(3) Received in European Patent Application No. 22854606.5, mailed on Mar. 6, 2026, 08 pages.

\* cited by examiner

400

START

TRAIN NEURAL ENCODER-DECODER TRANSFORMER MODEL    402
*CONSTRUCT SELF-SUPERVISED TRAINING DATASET
*TRAIN MODEL WITH  SELF-SUPERVISED TRAINING DATASET

DEPLOY MODEL IN SOFTWARE DEVELOPMENT ENVIRONMENT    404

RETURN

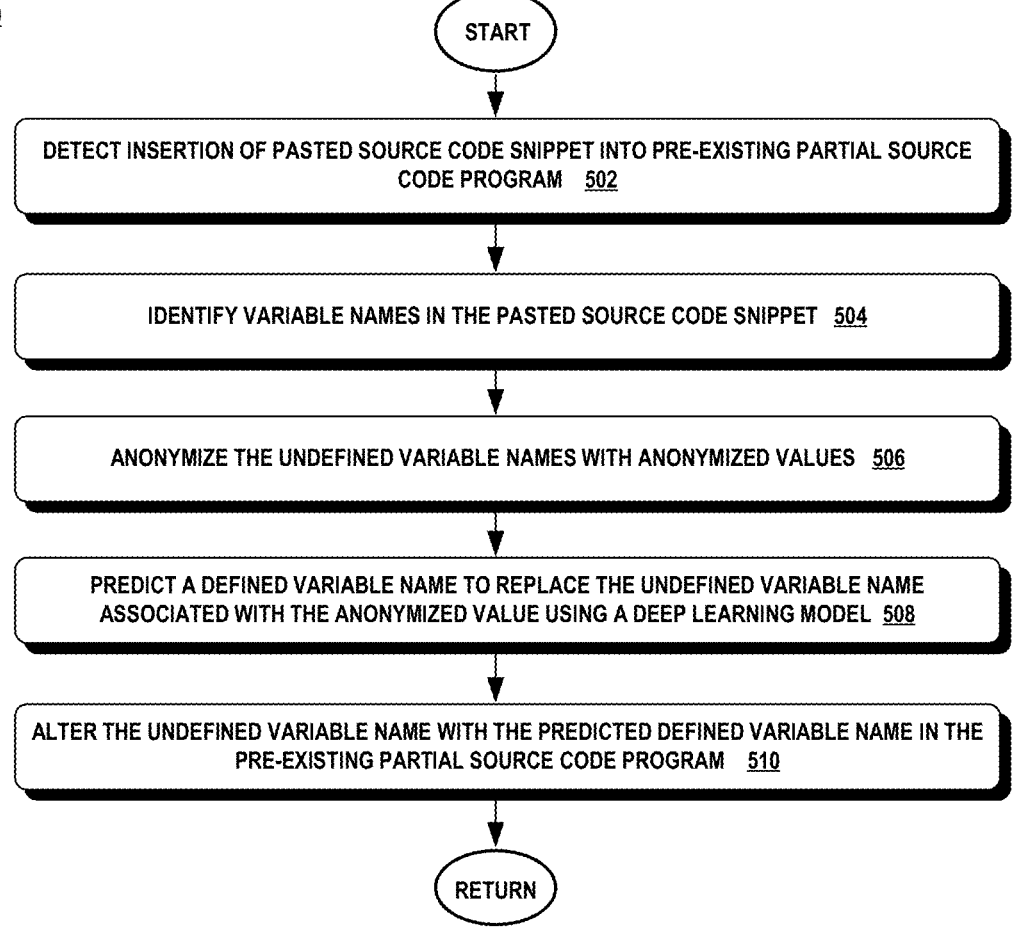

500

START

DETECT INSERTION OF PASTED SOURCE CODE SNIPPET INTO PRE-EXISTING PARTIAL SOURCE CODE PROGRAM   502

IDENTIFY VARIABLE NAMES IN THE PASTED SOURCE CODE SNIPPET   504

ANONYMIZE THE UNDEFINED VARIABLE NAMES WITH ANONYMIZED VALUES   506

PREDICT A DEFINED VARIABLE NAME TO REPLACE THE UNDEFINED VARIABLE NAME ASSOCIATED WITH THE ANONYMIZED VALUE USING A DEEP LEARNING MODEL   508

ALTER THE UNDEFINED VARIABLE NAME WITH THE PREDICTED DEFINED VARIABLE NAME IN THE PRE-EXISTING PARTIAL SOURCE CODE PROGRAM   510

RETURN

*FIG. 5*

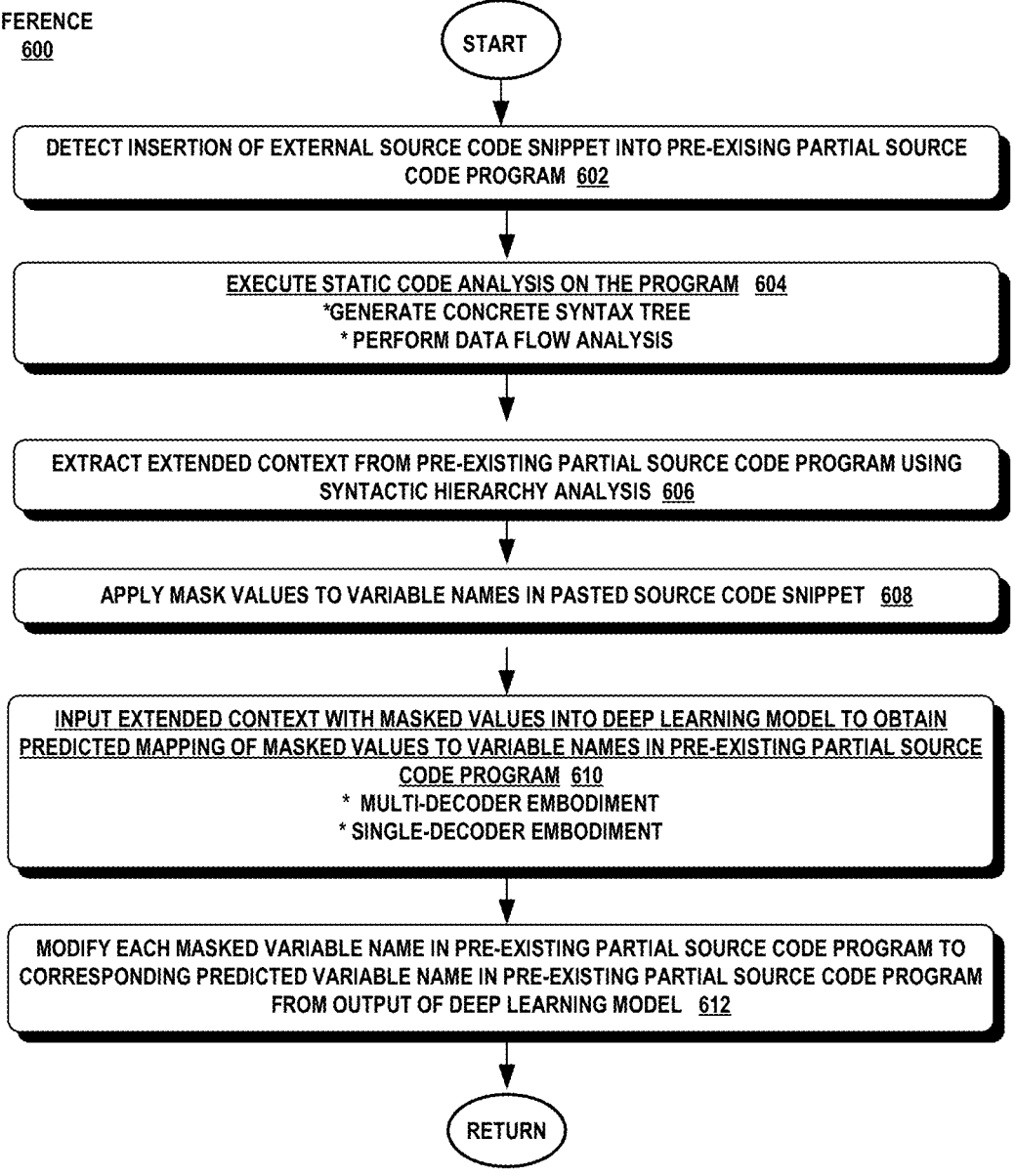

INFERENCE
600

START

DETECT INSERTION OF EXTERNAL SOURCE CODE SNIPPET INTO PRE-EXISING PARTIAL SOURCE CODE PROGRAM 602

EXECUTE STATIC CODE ANALYSIS ON THE PROGRAM 604
*GENERATE CONCRETE SYNTAX TREE
* PERFORM DATA FLOW ANALYSIS

EXTRACT EXTENDED CONTEXT FROM PRE-EXISTING PARTIAL SOURCE CODE PROGRAM USING SYNTACTIC HIERARCHY ANALYSIS 606

APPLY MASK VALUES TO VARIABLE NAMES IN PASTED SOURCE CODE SNIPPET 608

INPUT EXTENDED CONTEXT WITH MASKED VALUES INTO DEEP LEARNING MODEL TO OBTAIN PREDICTED MAPPING OF MASKED VALUES TO VARIABLE NAMES IN PRE-EXISTING PARTIAL SOURCE CODE PROGRAM 610
* MULTI-DECODER EMBODIMENT
* SINGLE-DECODER EMBODIMENT

MODIFY EACH MASKED VARIABLE NAME IN PRE-EXISTING PARTIAL SOURCE CODE PROGRAM TO CORRESPONDING PREDICTED VARIABLE NAME IN PRE-EXISTING PARTIAL SOURCE CODE PROGRAM FROM OUTPUT OF DEEP LEARNING MODEL 612

RETURN

*FIG. 6*

CODE ADAPTATION THROUGH DEEP LEARNING

CROSS-REFERENCE TO RELATED APPLICATION

The present application is a continuation of application Ser. No. 17/703,169 filed on Mar. 24, 2022, now U.S. Pat. No. 12,032,936, which is hereby incorporated by reference in its entirety.

BACKGROUND

Code completion is a tool that predicts the next string of characters that a developer (e.g., user, end-user, programmer, etc.) may type into a source code development tool, such as a source code editor, integrated development environment, and the like. Source code may consist of various code elements (e.g., keywords, delimiters, variables, methods, constants, operators, etc.) that are combined in a particular order in accordance with the grammar of the underlying programming language to form an expression. Code completion is used to complete a partially-formed source code snippet, such as a line of source code, a method invocation, a method signature, or a method body.

During source code development, developers often copy a source code snippet from an external source, such as GitHub or StackOverflow, and paste it into the source code program. However, the copy-pasted source code snippet is often not adapted to fit into the preexisting source code causing the developer to manually alter the copy-pasted source code snippet to adapt the copy-pasted source code snippet to form a semantically and syntactically correct program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A code adaptation mechanism automatically integrates the variable names of a source code snippet, copied and pasted into a pre-existing partial source code program, with the variable names defined in the pre-existing partial source code program. The variable names from the pasted source code snippet are replaced with anonymized values. A deep learning model predicts the most likely variable name from the pre-existing partial source code program to replace an anonymized value.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Aspects of the present disclosure pertain to the automatic adaptation of an external source code snippet into a pre-existing partial source code program to form a syntactically and semantically correct program. In an aspect, the technique adapts variable names found in an external source code snippet to conform to the variable usage of the pre-existing partial source code program. A deep learning model is used to predict the most likely variable name of the pre-existing partial source code program to associate with an undefined variable name of the external source code snippet.

In one aspect, the automatic adaptation technique is used for code completion. The code completion component of a source code development environment detects the insertion of a source code snippet, copied from an external source that is pasted into a pre-existing partial source code program, and automatically generates a mapping of the undefined variable names in the pasted source code snippet to the defined variable names used in the pre-existing partial source code program. The mapping is based on probability distributions generated by a deep learning model which are used to determine the most likely variable name of a defined pre-existing partial source code program to replace an undefined variable name in the pasted source code snippet.

Attention now turns to a more detailed description of the system, components, methods and devices used in the various aspects of the source code adaptation technique.

System

Figure 1:
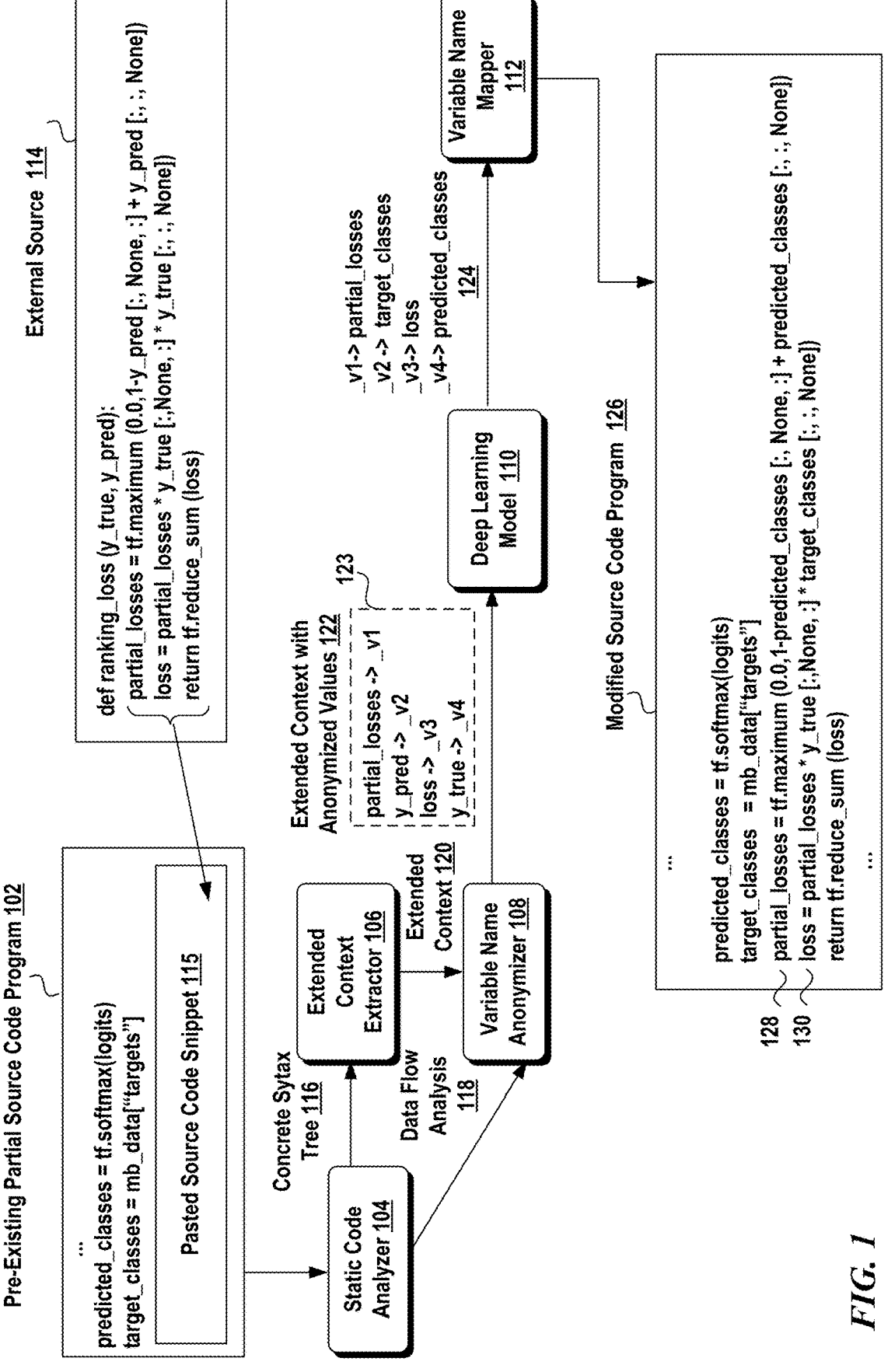
FIG. 1 is a schematic diagram illustrating an exemplary system for adapting source code through deep learning.

FIG. 1 illustrates a block diagram of an exemplary system 100 in which various aspects of the invention may be practiced. As shown in FIG. 1, system 100 includes a pre-existing or original partial source program 102, a static code analyzer 104, an extended context extractor 106, a variable name anonymizer 108, a deep learning model 110, and a variable name mapper 112.

The pre-existing partial source code program 102 may be embodied in a software development environment 102, such as a source code editor, integrated development environment (IDE), or application in which source code is developed. A pasted source code snippet 115 is copied into the pre-existing partial source code program 102 from an external source 114 to the pre-existing partial source code program. The external source has a lexical scope that is outside of the pre-existing partial source code program. An external source includes, without limitation, an external website (e.g., GitHub, StackOverflow), an external file, or other external sources.

The static code analyzer 104 parses the source code program into a concrete syntax tree 116 from which other static code analyses are performed. A concrete syntax tree 116 represents the syntactic structure of a program in a hierarchical or tree structure. The concrete syntax tree 116 is an n-ary tree data structure that includes nodes that represent a construct in the grammar of the programming language of a program. The concrete syntax tree 116 includes one root node, multiple internal nodes, and multiple terminal nodes. The terminal nodes represent source code tokens. A source code token is a symbol that represents an operand or an operator.

The concrete syntax tree 116 is utilized by the extended context extractor 106 to generate an extended context of the pre-existing partial source code program. The deep learning model 110 operates on sequence data of a fixed dimension. The deep learning model 110 is constrained to sequence data having a limited number of source code tokens that are included in an input sequence. The size of the input sequence affects the accuracy of the deep learning model. A larger size provides more context from which the model learns about the structure of the source code in order to generate more accurate results. However, increasing the size of the input sequence presents problems since it requires an enormous amount of computing resources to train the model and to make predictions which may be impractical. In order to compensate for this problem, the model is trained with an extended context of the source code program 120 that is based on a syntactic hierarchy. The syntactic hierarchy prioritizes certain code elements over other elements to represent the context of the pasted source code snippet in the pre-existing partial source code program. A code element is a sequence of contiguous source code tokens which corresponds to a set of concrete syntax tree nodes. The syntactic hierarchy is represented by a priority list that indicates the order in which the syntax elements in the source code program are extracted and used as the extended context. The prioritized list of code elements represents those code elements that are more closely associated with the context of the pasted source code snippet and are not limited to the source code immediately preceding the pasted source code snippet. The prioritized list of code elements includes code elements defined outside of the method embodying the pasted source code snippet. In this manner, the model is given a larger effective view back into the source code program for the model to learn predictive patterns that are used to make the predictions.

The term scope or lexical scope used in computer science refers to the part of the source code program where the binding of a name to an element (variable, method, constant, etc.) is defined. A local scope refers to when an element is defined within a method or function where it is used and a global scope refers to when an element is defined outside of the method where it is used. The syntax hierarchy of the priority list places certain elements in a program over other elements and may include elements of the source code program that are part of the local scope of another method in the program. Syntax elements of other scopes, such as a method or class defined outside of a method embodying the pasted source code snippet, are included as part of the extended context.

In one aspect, an exemplary syntax hierarchy includes the following prioritized order of syntax elements: (1) pasted source code snippet; (2) method signature of the focal method (i.e., method embodying the pasted source code snippet), the docstring of the focal method, if any, and the class name of the focal method; (3) global import statements; (4) assigned values, but not the assigned expression; (5) class attributes; (6) peer class method signatures, which are the method signatures of the same class as the focal method; (7) class docstring, if any, is the doctoring of the class of the focal method; (8) peer class method docstrings, if any, are the docstrings of the methods of the same class as the focal method; (9) global expressions; and (10) source code bodies of peer class methods of the focal method.

The static code analyzer 104 also generates a control flow graph in order to perform a data flow analysis on the pre-existing partial source code program with the pasted source code snippet. The data flow analysis 118 analyzes the data flow of the program in order to generate information on the definition and use of the variables in a program. The data flow analysis 118 generates def-use and use-def chains. A def-use chain lists the uses of a particular variable name reachable from the definition of the variable and a use-def chain indicates all the uses of a variable name reachable from its definition.

The variable name anonymizer 108 uses the data flow analysis 118 to identify the variable names from the pasted source code snippet 115. The variable names used in the pasted source code snippet are replaced with a masked or anonymized value 123.

The extended context with the anonymized values 122 is input into a deep learning model 110 which outputs a probability distribution 124 indicating the most likely tokens to replace each masked value. The probability distribution 124 is used to map each masked or anonymized value with a variable name defined in the pre-existing partial source code program. The variable name mapper 112 substitutes each masked value with the predicted variable name thereby generating the modified source code program 126.

As shown in FIG. 1, a developer (i.e., user, developer, client, etc.) copies three lines of the source code of the method body of ranking_loss, from external source 114, into the pre-existing partial source code program 102. The pasted source code snippet 115 includes variable names partial_losses, y_pred, loss, and y_true. All the variables of the pasted source code snippet are anonymized with masked values (e.g., _v1, _v2, _v3, _v4) 123. The extended context with the masked values 122 is input into the deep learning model 110.

The deep learning model 110 outputs a probability distribution 124 indicating the most likely variable names to replace each masked value. The variable name mapper 112 substitutes each masked value with the corresponding predicted variable name. As shown in the modified source code program 126, line 128 was altered to include predicted_classes instead of y_pred and line 130 was altered to include target_classes instead of y_true. predicted_classes and target_classes were both defined in the pre-existing partial source code program.

Attention now turns to a description of the various embodiments of the deep learning models.

Neural Transformer Models

A neural transformer with attention model is one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

It should be noted that the term neural transformer model and neural transformer with attention model are used interchangeably. It should also be noted that the aspects disclosed herein are described with respect to neural transformer with attention models. However, the techniques are not limited to these types of neural networks and can be applied to other types of deep learning models that utilize a neural network with a fixed-size context window.

Figure 2:
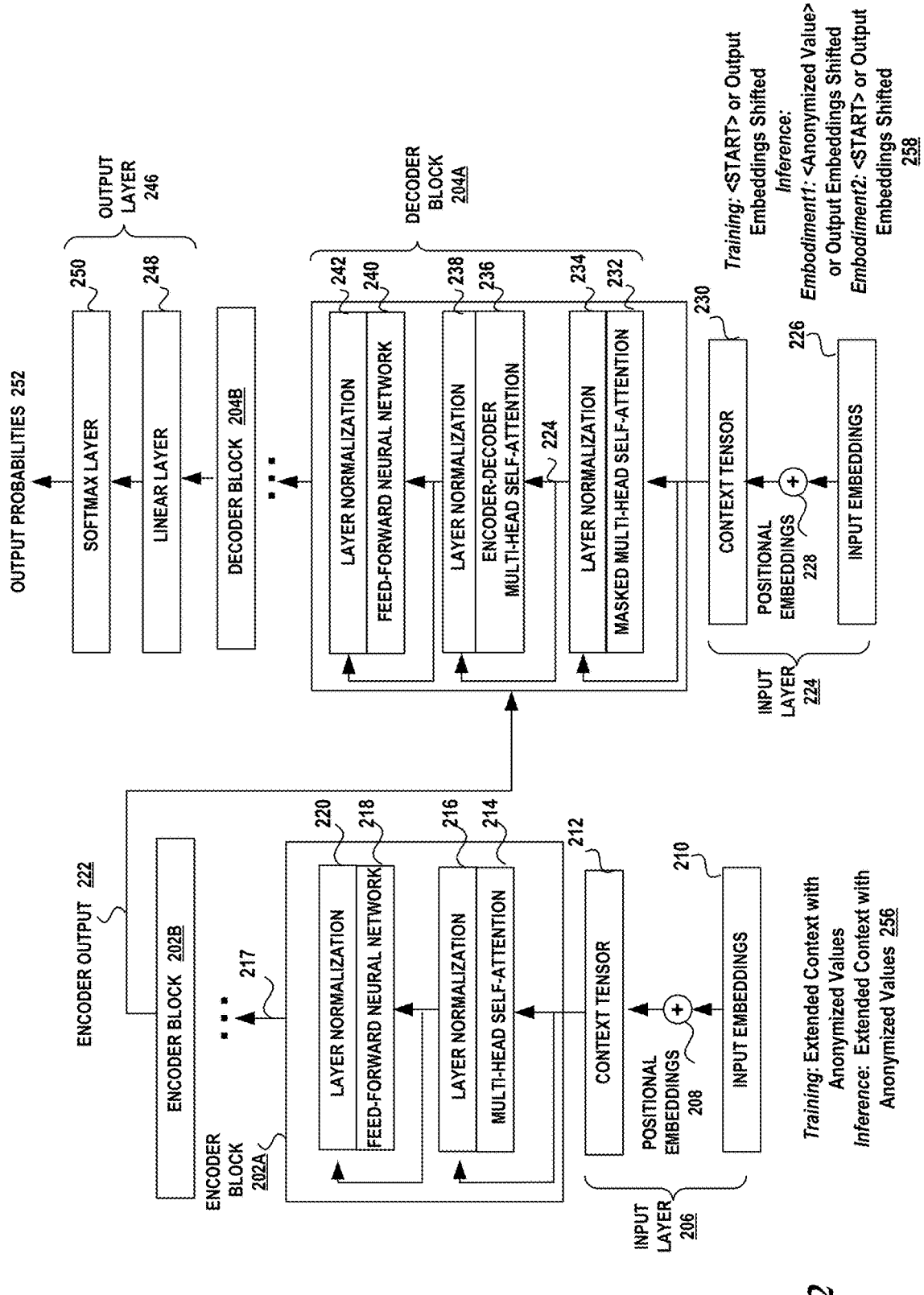
FIG. 2 is a schematic diagram illustrating an exemplary configuration of a neural transformer model with attention.

FIG. 2 shows an exemplary structure of the neural transformer model in an encoder-decoder configuration. The neural transformer model 200 contains one or more encoder blocks 202A-202B ("202") and one or more decoder blocks 204A-204B ("204"). The input layer 206 to the first encoder block 202A includes an input embedding layer 210, a positional embedding layer 208, and a context tensor 212.

The initial inputs to the first encoder block 202A are the input embeddings 210 of the input sequence of the extended context with anonymized values 256. In order to retain the order of the tokens in the input sequence, positional embeddings 208 are added to the input embedding 210 forming a context tensor 212. The initial input to the first decoder block 204A is a <START> token and at each subsequent time step the input is a shifted sequence of the output embeddings 226 from the previous time step to which the positional embeddings 228 are added forming context tensor 230.

An encoder block 202 consists of two layers. The first layer includes a multi-head self-attention component 214 followed by layer normalization component 216. The second layer includes a feed-forward neural network 218 followed by a layer normalization component 220. The context tensor 212 is input into the multi-head self-attention layer 214 of the encoder block 202 with a residual connection to layer normalization 216. The output of the layer normalization 216 is input to the feed forward neural network 218 with another residual connection to layer normalization 220. The output of the encoder block 202 is a set of hidden representations 217. The set of hidden representations 217 is then sent through additional encoder blocks, if multiple encoder blocks exist, or to the decoder 222.

Attention is used to decide which parts of the input sequence are important for each token, especially when decoding long sequences since the encoder is limited to encoding a fixed-size vector. Attention mechanisms gather information about the relevant context of a given token and then encode that context into a vector which represents the token. It is used to identity the relationships between tokens in the long sequence while ignoring other tokens that do not have much bearing on a given prediction.

The multi-head self-attention component 214 takes a context tensor 212 and weighs the relevance of each token represented in the context tensor to each other by generating attention weights for each token in the input embedding 210. In one aspect, the attention function is scaled dot-product attention which is described mathematically as follows:

$$\text{Attention } (Q, K, V) = softmax\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with $d_v$ output values which are concatenated to a final value:

MultiHead(Q, K, V)=Concat(head$_1$, . . . , head$_h$)W$^o$, where head$_i$=Attention(QW$_i^Q$, KW$_i^K$, VW$_i^V$), with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and W$^O \in \mathbb{R}^{hd_v \times d_{model}}$.

In order to reduce the training time of the neural transformer, layer normalization is used between the layers. The layer normalization component normalizes the inputs across the features. The mean and standard deviation is computed across the feature dimensions. There is a first layer normalization 216 that precedes the feed forward neural network 218 and a second layer normalization 220 that follows the feed forward neural network 218.

The feed-forward neural network 218 processes each output encoding separately. The output of the top encoder block is a set of attention vectors K and V 222 which is used by the encoder-decoder multi-head self-attention layer 236 of the decoder block 204.

The decoder block 204 predicts each token $t_i$ in the target language one-by-one at each time step conditioned on all previously-generated target tokens $t_1, \ldots t_{i-1}$. The decoder block 204 consists of three layers. The first layer includes a masked multi-head self-attention component 232 followed by a layer normalization component 234. The output of the layer normalization component 234 is input into the encoder-decoder multi-head attention component 236 with a residual connection to layer normalization component 238. The second layer includes an encoder-decoder multi-head self-attention component 236 followed by a layer normalization component 238. The output of layer normalization component 238 is input into the feed forward neural network 240 with a residual connection to layer normalization component 242. The third layer includes a feed forward neural network 240 followed by a layer normalization component 242.

The masked multi-head self-attention component 232 receives the output embeddings of the previous timestep. The masked multi-head self-attention component 232 masks the output embeddings from future time steps. The encoder-decoder multi-head self-attention layer 236 receives queries from the previous decoder layer 224 and the memory keys and values 222 from the output of the encoder block 202. In this manner, the decoder block 204 can attend to every position of the input sequence. The feed-forward neural network 240 processes each output encoding separately. A layer normalization component 234, 238, 242 is used between the layers in order to normalizes the inputs across the features.

The output layer 246 includes a linear layer 248 and a softmax layer 250. The linear layer 248 projects the vector produced by the stack of decoders into a logits vector. The softmax layer 250 then turns the scores of the logits vector into output probabilities for each token in the vocabulary V which are positive and normalized 252.

Training is the process where the model's parameters (i.e., embeddings, weights, biases) are learned from the training dataset. During training, the first encoder block receives a self-supervised training dataset of input sequences. An input sequence includes a sequence of input embeddings of the source code tokens that represent the extended context with the anonymized or masked values. In this manner, the model learns the syntactic structure of the programming language of the source code snippet as well as the semantics of the variable usage from the training samples.

Inference is the process where the model makes predictions given an input sequence of data. During inference, the first encoder block of the model receives an extended context of the program with anonymized values 256.

During training, the first decoder block receives an input embedding 226 representing a start token, <START> 258. Thereafter, at each subsequent time step, the input embedding 226 is the output embedding shifted by one token 258. During inference, the input sequence is based on the particular embodiment of the decoder blocks which is described below.

Model Configurations

Figures 3A, 3B:
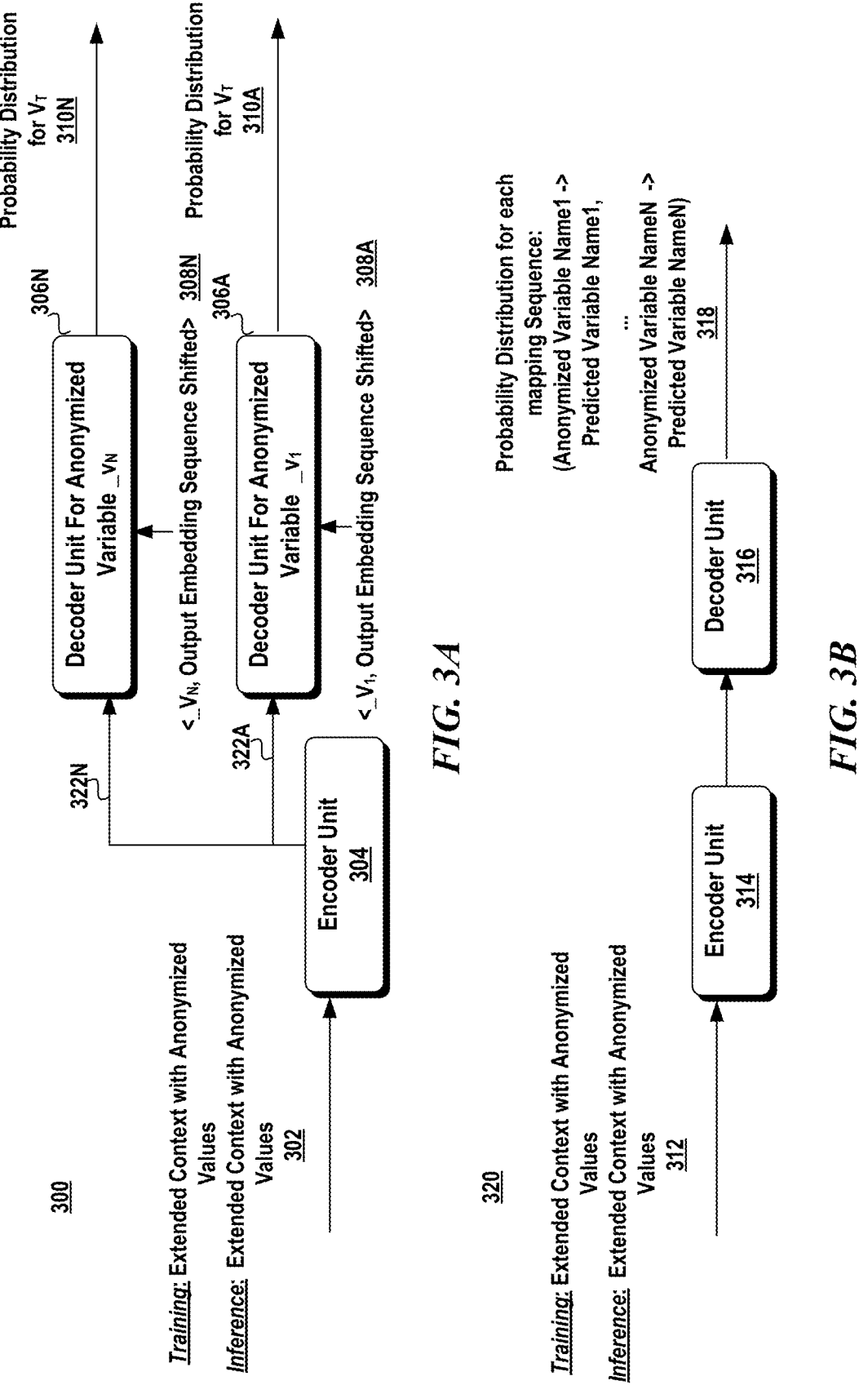
FIG. 3A is a schematic diagram illustrating an exemplary architecture of the neural transformer model in a first embodiment and FIG. 3B is a schematic diagram illustrating an exemplary architecture of the neural transformer model in a second embodiment.

Turning to FIG. 3A, there is shown a first embodiment of the encoder-decoder neural transformer model 300. In this embodiment, the encoder-decoder neural transformer model is configured with a single encoder unit 304 and with multiple decoder units 306A-306N. The encoder unit 304 includes multiple stacked encoder blocks and the decoder unit 306A-306N include multiple stacked decoder blocks. There is a different decoder unit for each anonymized value 306A-306N. The encoder output is transmitted to each decoder unit concurrently 322A-322N. Each decoder unit is responsible for decoding a particular anonymized value 306A-306N. Each decoder unit 322A-322N is trained with the same training data, in parallel, and learns the same parameter values (i.e., embeddings, attention weights, biases). The probability distribution output from each decoder unit 310A-310N indicates the likelihood of each token in the model's vocabulary being the variable name that replaces the particular anonymized value associated with the decoder 310A-310N.

During the training phase of the model, the training dataset includes input sequences, where each input sequence represents an extended context with anonymized values and the anonymized value mapping 302. During the inference phase of the model, the input sequence to the first encoder block represents the extended context with anonymized values 302. The first input sequence to the first decoder block is the anonymized value as a start symbol and thereafter the input sequence to the first decoder block is the output embedding sequence shifted 308A-308N.

Turning to FIG. 3B, in a second embodiment, the encoder-decoder neural transformer model is configured with a single encoder unit 314 with a single decoder unit 316. The model is trained on a supervised training dataset that includes input sequences consisting of sequences of token embeddings that represent the extended context with anonymized values 312. The decoder outputs a probability distribution over the model's vocabulary 318. The model's vocabulary consists of mappings where each mapping includes an anonymized value and its corresponding variable name in the pre-existing partial source code program.

Methods

Attention now turns to a more detailed description of the methods used in the system for constrained decoding for source code generation and translation. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Training

Figures 4, 5, 6:
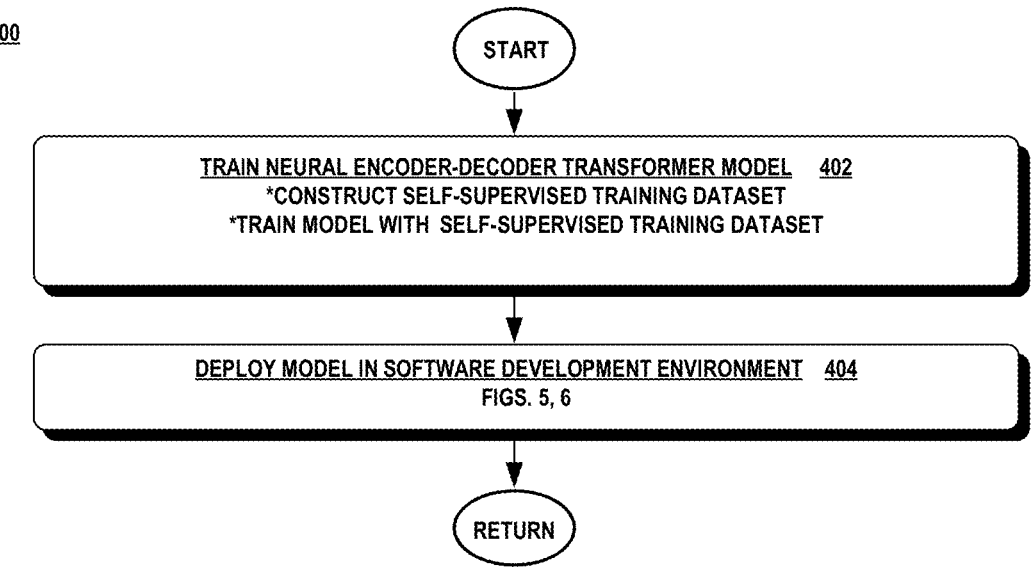
FIG. 4 is a flow diagram illustrating an exemplary method of self-supervised training and deployment of the deep learning model.
FIG. 5 is a flow diagram illustrating a first exemplary method for code adaptation.
FIG. 6 is a flow diagram illustrating a second exemplary method for code adaptation.

FIG. 4 illustrates an exemplary method 400 of the code adaptation process. The neural transformer model is trained to learn variable usage patterns.

The training of the model is performed by applying a training dataset of input sequences to the model. The training dataset is extracted from source code files of various source code repositories, that may be public or private. For each source code file, pasted source code snippets were extracted by randomly selecting pastable blocks within those files, removing them from the original source code file, and pasting them back into that file. This method of training is considered self-supervised training. The training dataset is split into a training dataset and a validation dataset. (Collectively, block 402).

The training dataset includes the extended context with anonymized values and the anonymized value mapping. The model learns from the loss calculations the correct actions that the model should take and learns to generalize its actions in order to act in situations not present in the training dataset. (Collectively, block 402).

Each sample of the training dataset is parsed into a concrete syntax tree (block 604). The priority list is obtained and used to extract sequences of tokens that represent each code element of the syntax hierarchy from the concrete syntax tree in the order denoted in the priority list. The sequence of tokens is tokenized into subtokens using Byte-Pair Encoding tokenization and transformed into embeddings forming an input sequence of embedding. The terms tokens and subtokens are used interchangeably. (Collectively, block 402).

The training dataset consists of thousands of samples that are applied to the model. Neural transformer models are trained iteratively, making multiple passes over the training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of input sequences from the context windows running through the training process. (Collectively, block 402).

The neural transformer model has multiple blocks and layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned. (Collectively, block 402).

For each input sequence of each batch in each epoch, the T-ordered sequences of subtokens are then mapped into numeric vectors and then into respective subtoken embeddings and positional embeddings. An embedding is a learned representation for the text-based subtokens where subtokens that have a common meaning have a common representation. An embedding is a mapping of discrete categorical variables to a vector of continuous numbers. There is an embedding for each subtoken in the vocabulary and a corresponding positional embedding. The subtoken embedding represents the learned representation for the subtoken. The neural transformer model does not read each subtoken sequentially and as such, has no knowledge of the subtoken's position in a sequence without additional position information. The positional embedding is used to embed position information about a subtoken's position in a sequence into the neural transformer model. (Collectively, block 402).

Initial values are generated for the subtoken embedding and positional embeddings of each sequence which are then used to form a context tensor. Thereafter, the neural transformer model learns the values for each embedding. Upon the completion of the training phase, the embeddings for each subtoken and the positional embeddings are saved into respective matrices for later use. There is a subtoken embedding matrix, We, that contains an embedding vector for each subtoken $t_i$, i=0 . . . . V, and a positional embedding matrix, Wp, that contains an embedding vector $P_j$, j=0 . . . . T, for each position, where V is the size of the vocabulary and T is the length of the subtoken sequence. (Collectively, block 402).

The first encoder block of the neural transformer model takes the context tensor as input and passes it through the multiple layers of multi-head self-attention, layer normalization and feed-forward neural network to finally produce the set of hidden representations If there are additional encoder blocks, the output of each encoder block is passed onto the next encoder block with the output of the last encoder block producing the set of hidden representations. The set of hidden representations is passed onto each decoder block. (Collectively, block 402).

The decoder blocks of the neural transformer model take a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T. Starting with the first token of the output sequence, the subtokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 402).

The feed forward neural networks in the encoder blocks and the decoder blocks are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 402).

Upon completion of the training of the model, the model is deployed in a source code development system (block 404).

Inference

FIG. 5 illustrates one aspect of an exemplary method 500 for utilizing the deep learning models for code adaptation. A developer copies a source code snippet from an external source and pastes it into a pre-existing partial source code program. The pre-existing partial source code program is partially-formed in a software development environment. The pasted source code snippet includes variable names that may not be defined in the pre-existing partial source code program and may include variable names that are defined in the pasted source code snippet. (Collectively, block 502).

The undefined variable names from the pasted source code snippet are identified through a data flow analysis of the pre-existing partial source code program containing the pasted source code snippet (block 504). Undefined variable names from the pasted source code snippet, other than API calls, keywords, and punctuations, are anonymized with masked values (block 506). A particular masked value is substituted for each variable name in the pre-existing partial source code program (block 506).

A deep learning model is given a context of the pre-existing partial source code program to predict a variable name defined in the pre-existing partial source code program to replace the undefined variable name in the pasted source code snippet. The deep learning model was trained to learn semantic variable usage patterns in order to predict the most likely variable name in the pre-existing partial source code program to replace the anonymized value and hence, the undefined variable name from the pasted source code snippet. (Collectively, block 508).

The deep learning model makes its predictions based on a context of the pre-existing partial source code program that includes the pasted source code snippet. In an aspect, the context includes an extended context that spans beyond the local context containing the pasted source code snippet. (Collectively, block 508).

The undefined variable names in the pasted source code snippet are then altered with the predicted variable name defined in the pre-existing partial source code program having the highest probability (block 510).

FIG. 6 illustrates another aspect of an exemplary method 600 for code adaptation using deep learning models. In this aspect, the code adaptation technique is utilized for source code development. A pre-existing partial source code program may be developed using a source code editor, IDE, or other type of development application. A developer may copy a source code snippet from an external source and paste it into the source code editor. The source code editor detects the insertion (block 602) and starts the code adaptation technique.

The pre-existing program with the pasted source code snippet is parsed into a concrete syntax tree and a data flow analysis is performed using the concrete syntax tree (block 604).

The extended context is generated from the pre-existing partial source code program using the concrete syntax tree and prioritized list of code elements (block 606). The variables used in the pasted source code snippet are anonymized with masked values (block 608).

The extended context with the anonymized or masked values are then input into the neural transformer model. The input sequence containing the extended context with the anonymized values is tokenized and then transformed into an input sequence of token embedding with corresponding positional embeddings. (Collectively, block 610).

The inference phase utilizes a beam search to find the most likely variable names to replace a masked value. A variable name may be composed of several subtokens/tokens that are concatenated to form a predicted variable name. The beam search iteratively generates tokens/subtokens, at each time step, by invoking the neural transformer model. The output of the neural transformer model, at each time step, is a matrix of token probabilities. The beam search concentrates on the k most probable tokens at each iteration to get the best path to the most likely variable name. At each iteration, each of the k most probable tokens are concatenated with the tokens in the preceding iterations to form a partial variable name. (Collectively, block 610).

A beam search uses a breadth-first search to build a search tree. The search tree is composed of nodes at one or more inference levels. Each node represents a probability distribution generated by the neural transformer model for the tokens/subtokens in the model vocabulary. At each level, only the top k tokens/subtokens having the highest probabilities from the output distribution generated by the neural transformer model are expanded to the next inference level. The variable k is preconfigured and also referred to as the beam width. Each of the k subtokens/tokens is then expanded into a search that updates the current context sequence with the selected subtoken/token to input into the neural transformer model to generate an additional probability distribution for the next token in a sequence. This process is repeated until the end-of-variable token is predicted as being the next likely token candidate. (Collectively, block 610).

For the model configuration shown in FIG. 3A, each decoder, at each time step, outputs a probability for each token/subtoken in the model's vocabulary replacing the masked value associated with the decoder. The model's vocabulary consists of a fixed number of subtokens/tokens learned from the training dataset. (Collectively, block 610).

For the model configuration shown in FIG. 3B, at each time step, the decoder outputs a probability for each mapping in the model's vocabulary. A mapping is a pair of values where each pair includes a masked value and a corresponding tokens/subtokens. (Collectively, block 610).

The variable name mapper receives the probability distributions output by the model and alters each masked value with the predicted variable name having the highest probability or the predicted mapping having the highest probability (block 612).

Exemplary Operating Environment

Figure 7:
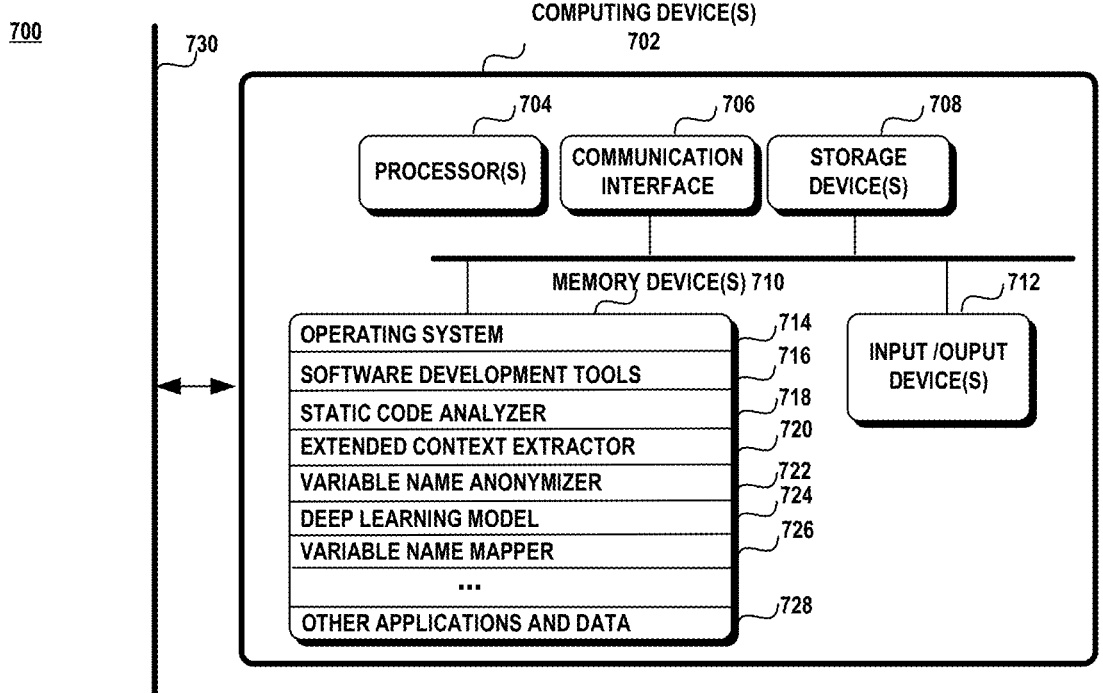
FIG. 7 is a block diagram illustrating an exemplary operating environment.

Attention now turns to a discussion of an exemplary operating environment 700. FIG. 7 illustrates an exemplary operating environment 700 in which one or more computing devices 702 are used to train a neural transformer model and use the neural transformer model for code adaptation to develop source code. However, it should be noted that the aspects disclosed herein is not constrained to any particular configuration of devices. Computing devices 700 may be configured as a source code development environment that utilizes the code adaptation system. It should be noted that the operating environment is not limited to any particular configuration and other configurations are possible.

A computing device 702 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 700 may be configured in a network environment, a distributed environment, a multi-processor environment, or a stand-alone computing device having access to remote or local storage devices.

A computing device 702 may include one or more processors 704, one or more communication interfaces 706, one or more storage devices 708, one or more memory devices or memories 710, and one or more input/output devices 712. A processor 704 may be any commercially available or customized processor and may include dual microprocessors and multi-processor architectures. A communication interface 706 facilitates wired or wireless communications between the computing device 702 and other devices. A storage device 708 may be computer-readable medium that does not contain propagating signals, such as modulated data signals transmitted through a carrier wave. Examples of a storage device 708 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 708 in the computing devices 702. The input/output devices 710 may include a keyboard, mouse, pen, voice input device, touch input device, display, speakers, printers, etc., and any combination thereof.

A memory device or memory 710 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 610 may also include one or more external storage devices or remotely located storage devices that do not pertain to propagated signals, such as modulated data signals transmitted through a carrier wave.

A memory device 710 may contain instructions, components, and data. A component is a software program that performs a specific function and is otherwise known as a module, program, and/or application. The memory device 710 may include an operating system 714, one or more software development tools 716, a static code analyzer 718, extended context extractor 720, a variable name analyzer 722, a deep learning model 724, a variable name mapper 726, and other applications and data 728.

A computing device 702 may be communicatively coupled via a network 730. The network 730 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 730 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of automatically adapting the variable usage of a copy-pasted source code snippet into the variable usage of a pre-existing partial source code program. The technical features associated with addressing this problem is the configuration of a deep learning model, such as a neural transformer model with attention, to predict a defined variable name in the pre-existing partial source code program to replace an undefined variable name from the copy-pasted source code snippet. The deep learning model is trained to learn variable usage patterns through the samples of the training dataset. The technical effect achieved is the automatic adaptation of the pasted code snippet into the pre-exiting partial source code program, without user intervention, in order to produce a syntactically and semantically correct program.

CONCLUSION

A computer-implemented method is disclosed, comprising: detecting insertion of a pasted source code snippet into a pre-existing partial source code program, wherein the pasted source code snippet includes a variable name undefined in the pasted source code snippet and the pre-existing partial source code program, wherein the pasted source code snippet comes from a source external to the pre-existing partial source code program; predicting a defined variable name from the pre-existing partial source code program to replace the undefined variable name from a probability distribution output from a deep learning model given a context of the pre-existing partial source code program; and altering the undefined variable name with the predicted defined variable name in the pre-existing partial source code program.

In an aspect, the method further comprises generating an extended context of the pre-existing partial source code program with the inserted pasted source code snippet, wherein the extended context includes code elements from the pre-existing partial source code program outside of a local scope of the pasted source code snippet.

In an aspect, the extended context is based on a prioritized list of the code elements. In an aspect, the method further comprises: transforming the undefined variable name into an anonymized value in the extended context; and providing the extended context to the deep learning model. In an aspect, the deep learning model includes a plurality of decoder units, wherein each decoder unit is associated with a select anonymized value, wherein each of the decoder units outputs a probability of the select anonymized value being a select defined variable name from the pre-existing partial source code program.

In an aspect, the probability distribution is based on a plurality of mappings, each mapping including an anonymized value and a corresponding variable name from the pre-existing partial source code program. In an aspect, the deep learning model includes a single decoder unit. In an aspect, the deep learning model is a neural transformer model with attention.

A system is disclosed comprising: one or more processors; and a memory that stores one or more programs that are configured to be executed by the one or more processors. The one or more programs including instructions to perform actions that: access a pre-existing partial source code program having a pasted source code snippet from an external source, wherein the pasted source code snippet includes one or more variable names undefined in the pre-existing partial source code program; replace each of the one or more variable names from the pasted source code snippet with a masked value; obtain from a deep learning model a predicted variable name to replace each masked value, wherein the deep learning model is given a select portion of the pre-exiting source code program, wherein each predicted variable name is defined in the pre-existing partial source code program; and alter each of the one or more variable names undefined in the pre-exiting source code program with a corresponding predicted variable name.

In an aspect, the select portion of the pre-existing partial source code program includes code elements from the pre-exiting source code program outside of a local scope of the pasted source code snippet. In an aspect, the one or more programs include instructions to perform actions that: extract the code elements from a concrete syntax tree representation of the pre-existing partial source code program in accordance with a priority list, wherein the priority list includes code elements outside of the local scope of the pasted source code snippet; and generate the extended context from the extracted code elements.

In an aspect, the one or more programs include instructions to perform actions that: perform a data flow analysis on the concrete syntax tree representation to identify the one or more variable names from the pasted source code snippet. In an aspect, the deep learning model includes a plurality of decoder units, wherein each of the plurality of decoder units is configured to predict a variable name to replace a particular masked value.

In an aspect, the deep learning model includes a single encoder unit coupled to each of the plurality of decoder units. In an aspect, the deep learning model includes a decoder unit, wherein the decoder unit is configured to output a probability for each of a plurality of mappings, wherein a mapping includes a particular masked value and a variable name defined in the pre-existing partial source code program to replace the particular masked value. In an aspect, the deep learning model is a neural transformer model with attention.

A computer-implemented method is disclosed, comprising: constructing a training dataset of a plurality of samples of source code programs with a portion of source code having undefined variable names; extracting an extended context for each of the plurality of samples; anonymizing each of the undefined variable names in each extended context with a select one of a plurality of anonymized values; training a deep learning model to learn variable usage patterns given the extended context of each of the plurality of samples; and applying the trained deep learning model to predict a defined variable name from a target source code program to replace an undefined variable name in an external source code snippet inserted into the target source code program.

In an aspect, the deep learning model includes a plurality of decoder units, each of the plurality of decoder units associated with a select one of the plurality of anonymized values, the training dataset is applied to each of the plurality of decoder units, and each of the plurality of decoder units outputs a probability distribution of the select one of the anonymized values with respect to each of the defined variable names in the target source code program.

In an aspect, the deep learning model predicts a mapping of each of the plurality of anonymized values with each of the defined variable names. In an aspect, the deep learning model is a neural transformer model with attention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

What is claimed:

1. A system comprising:
a processor; and
a memory that stores a program that is configured to be executed by the processor, the program comprising instructions to perform actions that:
obtain a plurality of source code samples, wherein a source code sample comprises source code with an undefined variable name;
extract an extended context for each of the plurality of source code samples;
anonymize each of the undefined variable names in each extended context with a select one of a plurality of anonymized values;
create a training dataset comprising the extended context of each of the plurality of source code samples with the corresponding select one of the plurality of anonymized values; and
train a deep learning model from the training dataset to learn to map a particular anonymized value to a defined variable name,
wherein the trained deep learning model generates the defined variable name from a target source code program to replace the undefined variable name from an external source code snippet pasted into the target source code program.

2. The system of claim 1, wherein the comprises instructions to perform actions that:

parse a select source code sample of the plurality of source code samples into a syntax tree representation; and
extract the extended context for the select source code sample from the syntax tree representation of the select source code sample based on a syntax hierarchy.

3. The system of claim 2, wherein the syntax hierarchy prioritizes code elements in a global scope of the select source code sample over code elements within a local scope of the select source code sample.

4. The system of claim 2, wherein the syntax hierarchy includes code elements outside of a local scope of the select source code sample.

5. The system of claim 1, wherein the deep learning model is a neural transformer model with attention.

6. The system of claim 5, wherein the neural transformer model with attention comprises a plurality of decoder units, wherein each of the plurality of decoder units is associated with a particular one of the plurality of anonymized values, and
wherein the training dataset is applied to each of the plurality of decoder units in parallel.

7. The system of claim 6, wherein each of the plurality of decoder units is trained to output a probability distribution for the particular one of the plurality of anonymized values.

8. The system of claim 5, wherein the neural transformer model with attention comprises a single encoder unit coupled to a single decoder unit, wherein the single decoder unit outputs a probability distribution for a plurality of mappings, wherein a mapping associates a particular one of the plurality of anonymized values and a corresponding defined variable name.

9. A hardware storage device having stored thereon computer executable instructions that are structured to be executable by a processor of a computing device to thereby cause the computing device to perform actions that:
retrieve a plurality of source code snippets having an undefined variable name;
extract an extended context from each of the plurality of source code snippets;
replace the undefined variable name in each extended context of each of the plurality of source code snippets with a select one of a plurality of anonymized values;
create a training dataset comprising a plurality of training samples, wherein a training sample comprises an extended context of a source code snippet with the undefined variable name replaced by the select one of the plurality of anonymized values; and
train a deep learning model from the training dataset to learn to map a particular anonymized value to a defined variable name,
wherein the trained deep learning model generates the defined variable name from a target source code program to replace the undefined variable name from an external source code snippet pasted into the target source code program.

10. The hardware storage device of claim 9, having stored thereon computer executable instructions that are structured to be executable by a processor of a computing device to thereby cause the computing device to perform actions that:
parse a select source code snippet of the plurality of source code snippets into a syntax tree representation; and
extract the extended context for the select source code snippet from the syntax tree representation of the select source code snippet based on a syntax hierarchy.

11. The hardware storage device of claim 10, wherein the syntax hierarchy prioritizes code elements in a local scope of the source code snippet over code elements outside of the local scope.

12. The hardware storage device of claim 10, wherein the syntax hierarchy includes code elements outside of a local scope of the source code snippet.

13. The hardware storage device of claim 9, wherein the deep learning model comprises a neural transformer model with attention having a plurality of decoder units, each of the plurality of decoder units is associated with a particular one of the plurality of anonymized values, and wherein the training dataset is applied to each of the plurality of decoder units in parallel.

14. The hardware storage device of claim 9, wherein the deep learning model comprises a neural transformer model with attention including a decoder unit that outputs a probability distribution for a plurality of mappings, wherein a mapping of the plurality of mappings associates a particular one of the plurality of anonymized values with a corresponding defined variable name.

15. A computer-implemented method comprising:

collecting a plurality of source code snippets having an undefined variable name;

extracting an extended context from each of the plurality of source code snippets;

transforming the undefined variable name in each extended context of each of the plurality of source code snippets with a select one of a plurality of anonymized values;

create a training dataset comprising a plurality of training samples, wherein a training sample comprises an extended context of a source code snippet with the undefined variable name replaced by the select one of the plurality of anonymized values;

constructing a deep learning model with a plurality of decoder units, wherein each decoder unit is associated with a select one of the plurality of anonymized values;

training the deep learning model from the training dataset to learn to map a particular anonymized value to a defined variable name, wherein each training sample is feed into each of the plurality of decoder units in parallel for a respective decoder unit to learn a mapping of the select one of the plurality of anonymized values to a corresponding defined variable name, wherein the trained deep learning model generates the defined variable name from a target source code program to replace the undefined variable name from an external source code snippet pasted into the target source code program.

16. The computer-implemented method of claim 15, comprising:

parsing a select source code snippet of the plurality of source code snippets into a syntax tree representation; and extracting the extended context for the select source code snippet from the syntax tree representation of the select source code snippet based on a syntax hierarchy.

17. The computer-implemented method of claim 16, wherein the syntax hierarchy prioritizes code elements in a method embodying the source code snippet with the undefined variable name.

18. The computer-implemented method of claim 16, wherein the syntax hierarchy includes code elements outside of a local scope of the source code snippet.

19. The computer-implemented method of claim 16, wherein the syntax hierarchy includes code elements from global import statements.

20. The computer-implemented method of claim 15, wherein the training dataset comprises further an anonymized value mapping for each training sample, wherein the anonymized value mapping associates a specific anonymized value with a specific defined variable name.

* * * * *